United States Patent
Harada et al.

(10) Patent No.: US 11,638,168 B2
(45) Date of Patent: *Apr. 25, 2023

(54) TERMINAL, RADIO COMMUNICATION METHOD, BASE STATION, AND SYSTEM

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 33 days.

This patent is subject to a terminal disclaimer.

(21) Appl. No.: 17/343,902

(22) Filed: Jun. 10, 2021

(65) Prior Publication Data
US 2021/0306894 A1    Sep. 30, 2021

Related U.S. Application Data

(63) Continuation of application No. 16/475,920, filed as application No. PCT/JP2018/000056 on Jan. 5, 2018, now Pat. No. 11,076,310.

(30) Foreign Application Priority Data

Jan. 6, 2017   (JP) .............................. JP2017-001439

(51) Int. Cl.
*H04W 24/10* (2009.01)
*H04W 16/28* (2009.01)
*H04W 88/02* (2009.01)

(52) U.S. Cl.
CPC ............ *H04W 24/10* (2013.01); *H04W 16/28* (2013.01); *H04W 88/02* (2013.01)

(58) Field of Classification Search
CPC ...... H04W 24/10; H04W 88/00; H04W 16/28
See application file for complete search history.

(56) References Cited

U.S. PATENT DOCUMENTS

| | | | | |
|---|---|---|---|---|
| 2013/0121185 | A1* | 5/2013 | Li ........................ | H04B 7/0617 370/252 |
| 2013/0263167 | A1* | 10/2013 | Parthasarathy ..... | H04L 41/5067 455/406 |
| 2017/0026938 | A1* | 1/2017 | Onggosanusi ........ | H04L 5/0053 |
| 2017/0111886 | A1* | 4/2017 | Kim .................... | H04W 72/042 |
| 2017/0208494 | A1* | 7/2017 | Moon .................... | H04L 5/0048 |

(Continued)

OTHER PUBLICATIONS

Office Action issued in Indian Application No. 201917027307 dated Dec. 29, 2021 (6 pages).

(Continued)

*Primary Examiner* — Fahmida S Chowdhury
(74) *Attorney, Agent, or Firm* — Osha Bergman Watanabe & Burton LLP

(57) ABSTRACT

A terminal is disclosed that includes a receiver that receives a measurement configuration including an information on a number of reports. The terminal also includes a processor that, when reporting of a cell-level measurement result is triggered, controls reporting of a beam-level measurement result based on the information on the number of reports, where the measurement configuration includes a maximum number of beam-level measurement result reports. In other aspects, a radio communication method, a base station, and a system are also disclosed.

6 Claims, 14 Drawing Sheets

(56) References Cited

U.S. PATENT DOCUMENTS

| | | | |
|---|---|---|---|
| 2017/0339602 A1 | 11/2017 | Bergstrom et al. | |
| 2017/0367014 A1 | 12/2017 | Bergstrom et al. | |
| 2018/0220317 A1 | 8/2018 | Yilmaz et al. | |
| 2018/0359790 A1* | 12/2018 | Ingale | H04W 8/22 |
| 2019/0058518 A1* | 2/2019 | Koskela | H04B 7/0617 |
| 2019/0116530 A1* | 4/2019 | Da Silva | H04W 24/10 |
| 2019/0280790 A1* | 9/2019 | Li | H04W 24/10 |

OTHER PUBLICATIONS

Office Action issued in the counterpart European Patent Application No. 18735881.7, dated May 28, 2021 (6 pages).
International Search Report issued for PCT/JP2018/000056, dated Mar. 20, 2018 (5 pages).
Written Opinion issued for PCT/JP2018/000056, dated Mar. 20, 2018 (4 pages).
LG Electronics; "Discussion on RRM Measurement in IDLE Mode"; 3GPP TSG RAN WG1 Meeting #87 R1-1611799; Reno, USA, Nov. 14-18, 2016 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG-RAN2 Meeting #96; R2-168255 "Measurement and Mobility in high frequency" Huawei, HiSilicon; Reno, Nevada, USA; Nov. 14-18, 2016 (4 pages).
Extended European Search Report issued in European Application No. 18735881.7, dated Jul. 29, 2020 (11 pages).
Office Action issued in the counterpart Chinese Patent Application No. 201880015830.8, dated May 30, 2022 (17 pages).

* cited by examiner

TERMINAL, RADIO COMMUNICATION METHOD, BASE STATION, AND SYSTEM

CROSS-REFERENCE TO RELATED APPLICATIONS

This application is a continuation application of U.S. patent application Ser. No. 16/475,920, filed on Jul. 3, 2019, which is a national phase application of PCT/JP2018/000056, filed on Jan. 5, 2018, which claims priority to Japanese Patent Application No. 2017-001439, filed on Jan. 6, 2017. The contents of these applications are hereby incorporated by reference in their entirety.

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," "LTE Rel. 12" or "LTE Rel. 13") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. Furthermore, in CA, a plurality of CCs of the same radio base station (eNB: eNodeB) are configured in a user terminal (user equipment (UE)).

Meanwhile, in LTE Rel. 12, dual connectivity (DC), in which multiple cell groups (CGs) formed by different radio base stations are configured in a UE, is also introduced. Each cell group is comprised of at least one cell (CC). In DC, since multiple CCs of different radio base stations are integrated, DC is also referred to as "inter-eNB CA."

Also, in existing LTE systems (for example, LTE Rel. 8 to 13), the synchronization signals (PSS, SSS, etc.), broadcast channel (PBCH) and so on which a user terminal uses in initial access procedures are allocated to fields that are determined in advance on a fixed basis. By detecting the synchronization signals in cell search, the user terminal can establish synchronization with the network, and, furthermore, identify the cell (for example, cell ID) which the user terminal should connect with. Furthermore, the user terminal can acquire system information by receiving the broadcast channel (PBCH, SIB) after the cell search.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

Future radio communication systems (for example, 5G, NR, etc.) are expected to realize various radio communication services so as to fulfill mutually varying requirements (for example, ultra high speed, large capacity, ultra-low latency, etc.).

For example, NR is under study to provide radio communication services referred to as "eMBB (Enhanced Mobile Broad Band)," "IoT (Internet of Things)," "MTC (Machine Type Communication)," "M2M (Machine To Machine)," "URLLC (Ultra Reliable and Low Latency Communications)," and so on. Note that, M2M may be referred to as "D2D (Device To Device)," "V2V (Vehicle To Vehicle)," and so on depending on communication devices. In order to meet the above-noted demand for various types of communication, designing new communication access schemes (New RAT (Radio Access Technology)) has been under study.

In NR, study is in progress to provide services using a very high carrier frequency of 100 GHz, for example. Generally, it becomes more difficult to secure coverage as the carrier frequency increases. The reasons for this include that the distance-induced attenuation becomes more severe and the rectilinearity of radio waves becomes stronger, the transmission power density decreases because ultra-wide-band transmission is performed, and so on.

Therefore, in order to meet the demands of the above-noted various types of communication even in high frequency bands, study is in progress to use massive MIMO (massive MIMO (Multiple Input Multiple Output)), which uses a very large number of antenna elements. When a very large number of antenna elements are used, beams (antenna directivity) can be formed by controlling the amplitude and/or the phase of the signals transmitted/received from each element. This process is also referred to as "beam forming (BF)," and it becomes possible to reduce the propagation loss of radio waves.

Meanwhile, when beam forming is applied, a problem lies in how to control measurement operation of user terminals (for example, measurement operation and/or measurement result report, and so on. For example, it may be possible to perform measurement operation for each cell (cell level) and/or each beam (beam level), but in such a case, a problem lies in how to control communication.

The present invention has been made in view of the above, and it is therefore an object of the present invention to provide a user terminal and a radio communication method, whereby communication in accordance with measurement operation can be performed adequately even when beam forming is applied.

Solution to Problem

According to one aspect of the present invention, a user terminal has a receiving section that receives a DL measurement signal transmitted from one or a plurality of antenna ports, a measurement section that performs cell level measurement and/or beam level measurement using the DL measurement signal, and a control section that controls reporting of the measurement result of the cell level measurement and/or beam level measurement, wherein the control section controls random access using resources configured in accordance with a reporting target of the measurement result.

Advantageous Effects of Invention

According to the present invention, communication in accordance with measurement operation can be performed adequately even when beam forming is applied.

DESCRIPTION OF EMBODIMENTS

Future radio communication systems are expected to realize various radio communication services so as to fulfill mutually varying requirements (for example, ultra-high speed, large capacity, ultra-low latency, etc.). For example, for future radio communication systems, as mentioned earlier, study is in progress to perform communication using beam forming (BF).

BF can be classified into digital BF and analog BF. Digital BF refers to a method of performing precoding signal processing on the baseband (for digital signals). In this case, inverse fast Fourier transform (IFFT)/digital-to-analog conversion (DAC)/RF (Radio Frequency) need to be carried out in parallel processes, as many as the number of antenna ports (RF Chains). Meanwhile, it is possible to form a number of beams according to the number of RF chains at an arbitrary timing.

Analog BF refers to a method of using phase shifting devices on RF. In this case, since it is only necessary to rotate the phase of RF signals, analog BF can be realized with simple and inexpensive configurations, but it is nevertheless not possible to form a plurality of beams at the same time. To be more specific, when analog BF is used, each phase shifting device can only form one beam at a time.

Therefore, if a base station (referred to as "evolved Node B (eNB)," "BS (Base Station)," "gNB," etc.) has only one phase shifting device, only one beam can be formed at a given time. Therefore, when multiple beams are transmitted using analog BF alone, it is not possible to simultaneously transmit these beams using the same time resources, and therefore the beams need to be switched in time, be rotated, and so on.

Note that it is also possible to adopt a hybrid BF configuration which combines digital BF and analog BF. Although study is in progress to introduce massive MIMO in future radio communication systems (for example, 5G), if it is attempted to form an enormous number of beams with digital BF alone, the circuit configuration becomes expensive. For this reason, 5G is assumed to use analog BF configurations or hybrid BF configurations.

Figure 1B:
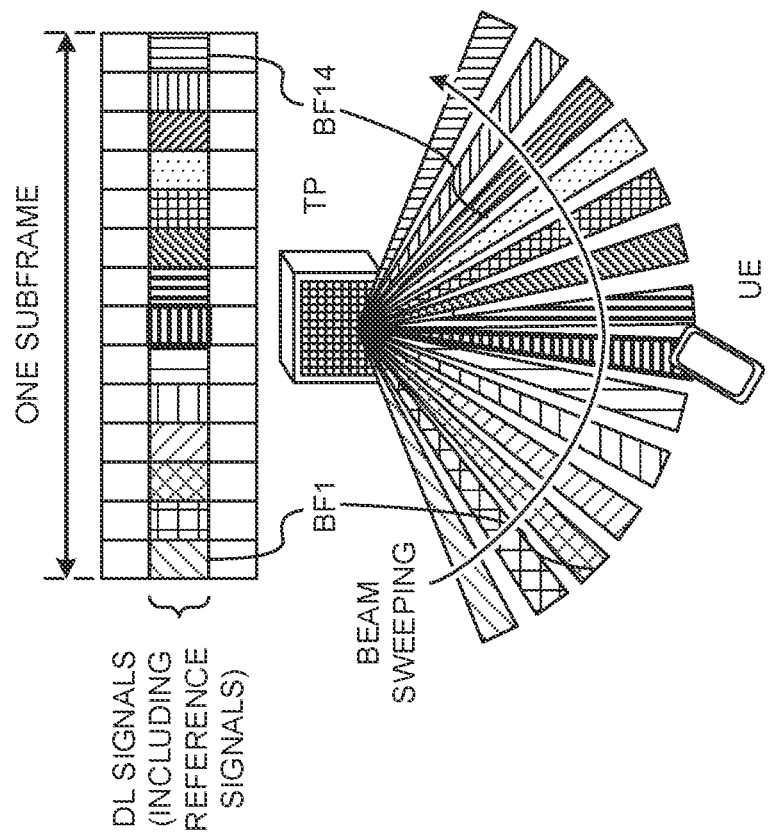
FIG. 1A and FIG. 1B are diagrams to explain the concept of single-BF operation and multiple-BF operation.
Figure 1A:
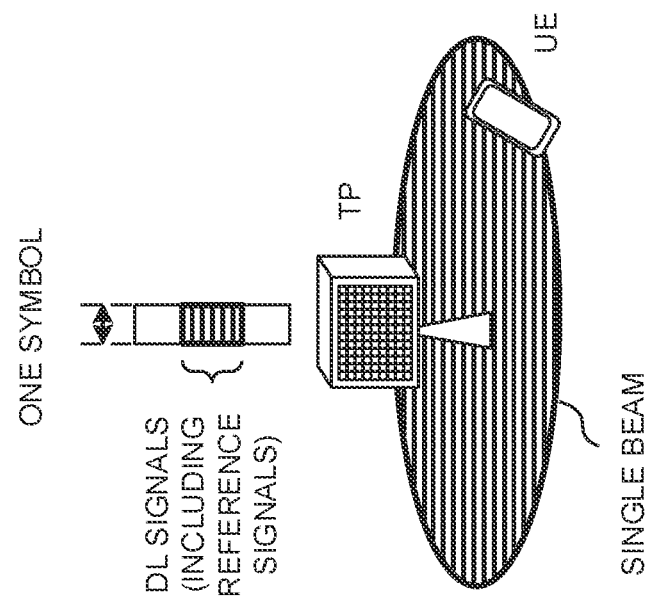

As for BF operations, there are single-BF operation using one BF, and multiple-BF operation using multiple BFs. FIG. 1A illustrates an example of single-BF operation, and FIG. 1B illustrates an example of multiple-BF operation. In a cell using single-BF operation, DL signals (for example, reference signals) are transmitted in a single beam pattern (for example, non-directional beam) to form an area.

Also, in NR, as an L1/L2 beam control method for use in the scenario in which cells are formed with multiple beams, study is in progress to send measurement reports for beam selection by using the CSI-RS (CSI measurement RS) or the mobility reference signal (MRS). Here, the MRS has only to be a signal that can be used as an RRM measurement RS, and may be an existing synchronization signal (for example, PSS/SSS), an existing reference signal (for example, the CRS, the CSI-RS, etc.), or a signal that is obtained by extending/modifying these signals.

Note that, in an RRM measurement report, a UE may report information related to received power (for example, RSRP (Reference Signal Received Power)). In a CSI measurement report, the UE may report CSI related to at least one of a channel quality indicator (CQI), a precoding matrix indicator (PMI), a precoding type indicator (PTI), a rank indicator (RI) and so on. Note that, in the specification, the term "measurement report" may be interchangeable with "measurement and/or report."

Now, in existing LTE systems (for example, LTE Rel. 13), due to the mobility (L3 mobility) that requires RRC signaling, a UE measures and reports the quality of cells by using reference signals (for example, CRSs). This measurement is made per cell, therefore also referred to as "cell-level measurement."

On the other hand, in NR, for mobility requiring RRC signaling (L3 mobility), measurement operation using MRS and so on for a UE (for example, UE in the connection mode (CONNECTED mode UE)) is supported. Possible examples of the measurement include (1) a method of reporting only a cell-level measurement result (Assumption 1), (2) a method of reporting only a beam-level measurement result (Assumption 2), and (3) a method of reporting both cell-level measurement result and beam-level measurement result (Assumption 3).

Figure 2:
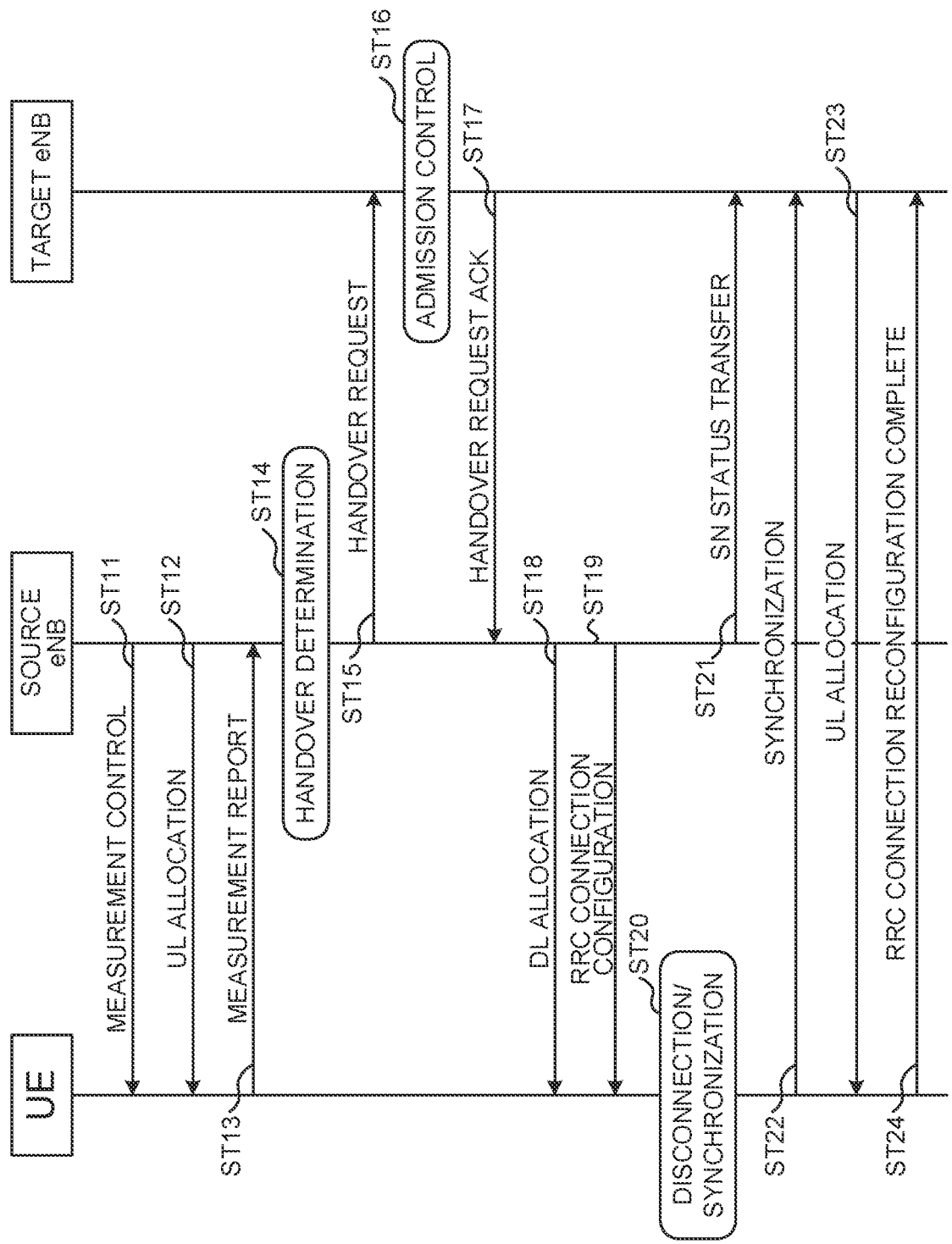
FIG. 2 is a diagram to explain mobility operation using measurement in an existing LTE system.

Here, FIG. 2 illustrates mobility operation (for example, handover) using measurement in an existing LTE system.

First, a source eNB transmits measurement control to a UE (ST 11). The measurement control includes a measurement configuration. The measurement configuration is composed of a measurement target, a measurement identity and a reporting configuration. Each measurement identity is associated with one measurement target and one reporting configuration. When a plurality of measurement identities are configured, a plurality of measurement targets are associated with the same reporting configuration, or a plurality of reporting configurations are associated with the same measurement target.

Also, the source eNB transmits UL allocation to the UE (ST 12). The UE transmits a measurement report to the source eNB (ST 13). The source eNB determines whether to perform handover based on the measurement report (ST 14).

When handover is performed, the source eNB transmits a handover request to a target eNB (ST 15). The target eNB performs admission control (ST 16) and then transmits a handover request ACK to the source eNB (ST 17).

The source eNB transmits DL allocation to the UE (ST 18). Also, the source eNB transmits an RRC connection reconfiguration to the UE (ST 19). The RRC connection reconfiguration includes mobility control information. Also, the handover request ACK and RRC connection reconfiguration include a new C-RNTI, a target eNB security algorithm indicator, and optionally, a dedicated PRACH, a target eNB SIB, and so on.

The UE receives the DL allocation and RRC connection reconfiguration and then disconnects the connection with an old cell and establishes synchronization with a new cell (ST 20). Meanwhile, the source eNB transmits an SN status transfer to the target eNB (ST 21).

The UE establishes synchronization with the target eNB (ST 22) and accesses the target cell through a RACH. In this case, when a dedicated PRACH is indicated, contention free random access is performed, and when the dedicated PRACH is not indicated, contention random access is performed.

Then, the target eNB transmits UL allocation to the UE (ST 23). The UE transmits an RRC connection reconfiguration complete to the target eNB (ST 24).

Figure 3:
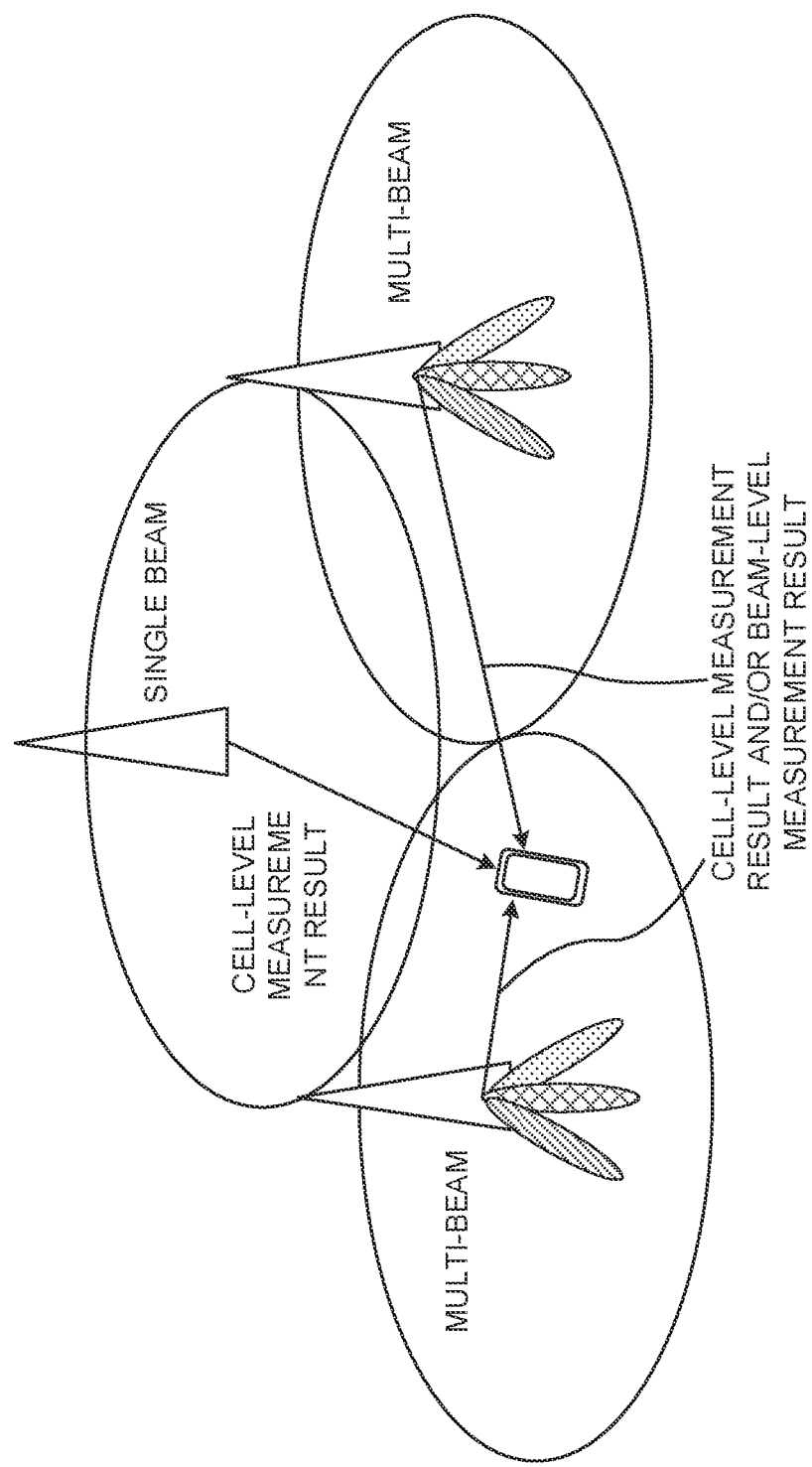
FIG. 3 is a diagram to show the reporting mode of measurement result considering mobility.

On the other hand, in the NR as described-above, it may be possible to perform measurement operation (measurement and/or report) at a cell level (each cell) and/or beam level (each beam) (see, FIG. 3, low frequency multibeam scenario). However, the problem lies in how to control communication (for example, measurement operation, mobility operation, and so on) in such a case.

In light of the above, the present inventors focused on the measurement operation (measurement and/or report) at a cell level and/or beam level, and came up with the idea of controlling communication in accordance with measurement operation.

For example, according to one example of the present embodiment, in a UE that receives a DL measurement signal transmitted from one or more antenna ports (for example, DL signal to which beam forming is applied), performs cell level measurement and/or beam level measurement using the DL measurement signal, and controls reporting of the measurement result of cell level measurement and/or beam level measurement, random access is controlled using resources configured in accordance with a reporting target of the measurement result. According to one example of the present embodiment, the UE performs measurement on beams in the mode that the UE is connected to the eNB and reports the measurement result alone or with the measurement result for cell.

Now, embodiments of the present invention will be described in detail below with reference to the accompanying drawings. Note that the radio communication methods according to individual embodiments may be applied individually or may be applied in combination.

Note that each beam in the present specification is identified based on, but not limited to, at least one of following (1) to (9): (1) the resource (for example, the time and/or frequency resource), (2) the SS block (SS block index), (3) the antenna port, (4) precoding (for example, whether or not precoding is applied, the precoding weight, etc.), (5) the transmission power, (6) the phase rotation, (7) the beam width, (8) the beam angle (for example, the tilt angle), and (9) the number of layers. Also, the term "beam" used in the present specification may be used interchangeably with at least one of above (1) to (9), and, for example, "beam" may be read as "resource," "antenna port" and so on. Note that, when precoding is different, precoding weight may be different, or precoding scheme (for example, linear precoding or non-linear precoding) may be different. When linear or non-linear precoding is applied to a beam, transmission power, phase rotation, the number of layers, and so on may vary.

Examples of the linear precoding include precoding in accordance with zero-forcing (ZF) criteria, regularized zero-forcing (R-ZF) criteria, minimum mean square error (MMSE) criteria, and so on. Also, examples of the non-linear precoding include precoding such as dirty paper coding (DPC), vector perturbation (VP), tomlinson harashima precoding (THP), and so on. Note that the precoding to be applied is not limited thereto.

First Example (Assumption 1)

In the first example, the case where a cell level measurement result is reported will be described. That is, in the first example, random access is controlled using resources configured in accordance with a reporting target of cell level measurement result. As the cell level measurement result, for example, results such as RSRP, RSRQ (Reference Signal Received Quality) of each cell and/or related cell ID, and so on are used.

Figures 4A, 4B:
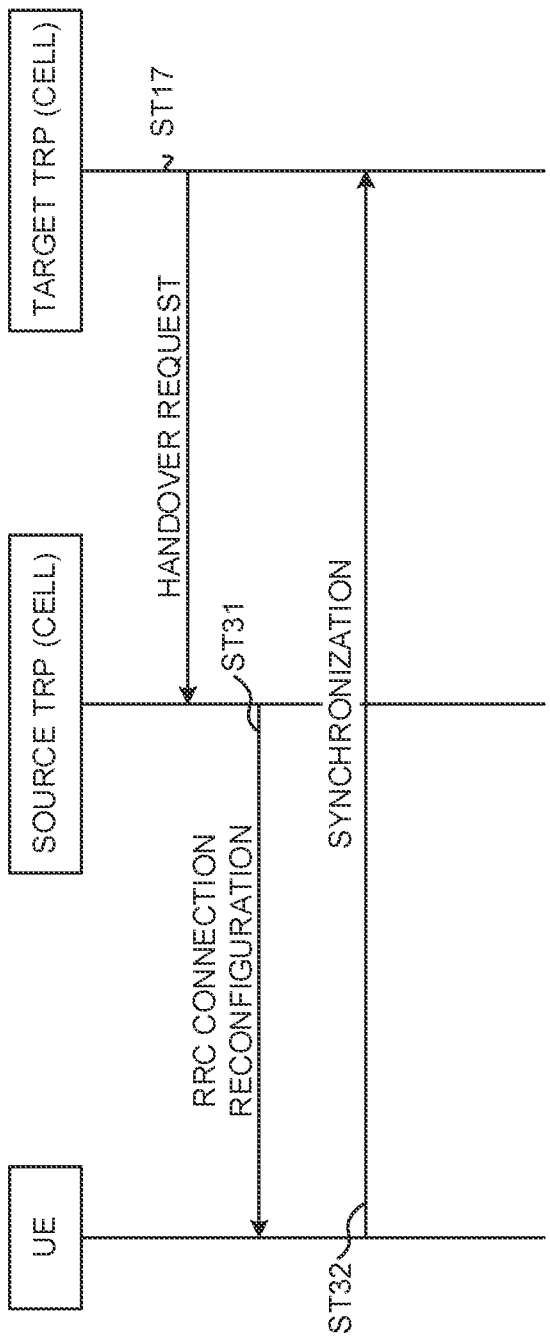
FIG. 4A is a diagram to show mobility operation in a first example (for example, handover)
FIG. 4B is a diagram to explain the allocation of RACH resource/preamble in the case of contention free random access in the first example.

FIG. 4A is a diagram to show mobility operation (for example, handover) in the first example. Although the description of the operation from measurement control ST 11 to admission control ST 16 is omitted in FIG. 4A, the operation thereof may be the same as in FIG. 2.

A target TRP (Transmission and Reception Point) (cell) performs admission control (ST 16) and then transmits a handover request ACK to the source TRP (ST 17). The source TRP transmits an RRC connection reconfiguration to the UE (ST 31). The RRC connection reconfiguration includes mobility control information.

Here, the synchronization between the UE and target TRP includes contention-based random access and contention-free random access. In the contention-based random access, the UE transmits a preamble randomly selected from a plurality of preambles (also referred to as a "random access preamble," a "random access channel (physical random access channel (PRACH))," an "RACH preamble," and so on) configured in each cell. On the other hand, in the contention-free random access, the TRP allocates a UE-specific preamble through a downlink (DL) control channel (PDCCH: Physical Downlink Control Channel, EPDCCH: Enhanced PDCCH, and so on), and the UE transmits the preamble allocated from the TRP.

In the contention-based random access, the RRC connection reconfiguration includes an RACH resource/preamble configuration (configuration for target TRP multibeam).

Meanwhile, in the contention-free random access, the RRC connection reconfiguration includes an RACH resource/preamble configuration. In this case, different RACH resource/preamble for contention-based or contention free is associated for each transmission beam. For example, as shown in FIG. 4B, for transmission beam #1, contention-based RACH resource/preamble #1 is allocated, and contention free RACH resource/preamble #2 is allocated. For transmission beam #2, contention-based RACH resource/preamble #3 is allocated, and contention free RACH resource/preamble #4 is allocated. Contention free RACH resources/preambles for respective transmission beams are allocated to the UE by the TRP. The present invention is not limited to the example in FIG. 4B, and can also be applied to the case of employing three or more transmission beams.

Also, the RRC connection reconfiguration includes a new C-RNTI, a target TRP security algorithm indicator, optionally, a dedicated PRACH, an SIB of the target TRP, and so on.

The source TRP transmits DL allocation to the UE. The UE receives the DL allocation and RRC connection reconfiguration and then disconnects the connection with an old cell and establishes synchronization with a new cell. Meanwhile, the source TRP transmits an SN status transfer to the target TRP.

Synchronization is established between the UE and target TRP (ST 32). In the synchronization, contention-based random access or contention free random access is performed. Then, the target TRP transmits UL allocation to the UE. The UE transmits an RRC connection reconfiguration complete to the target TRP.

In the first example, only the cell level measurement result is reported, and thus the overhead of the report can be reduced.

Second Example (Assumption 2)

In the second example, the case where a beam level measurement result is reported will be described. That is, in the second example, random access is controlled using resources configured in accordance with a reporting target of beam level measurement result. As the beam level measurement result, for example, RSRP, RSRQ (Reference Signal Received Quality) for each beam and/or a related beam ID, and a cell ID, and so on are used.

Figure 5:
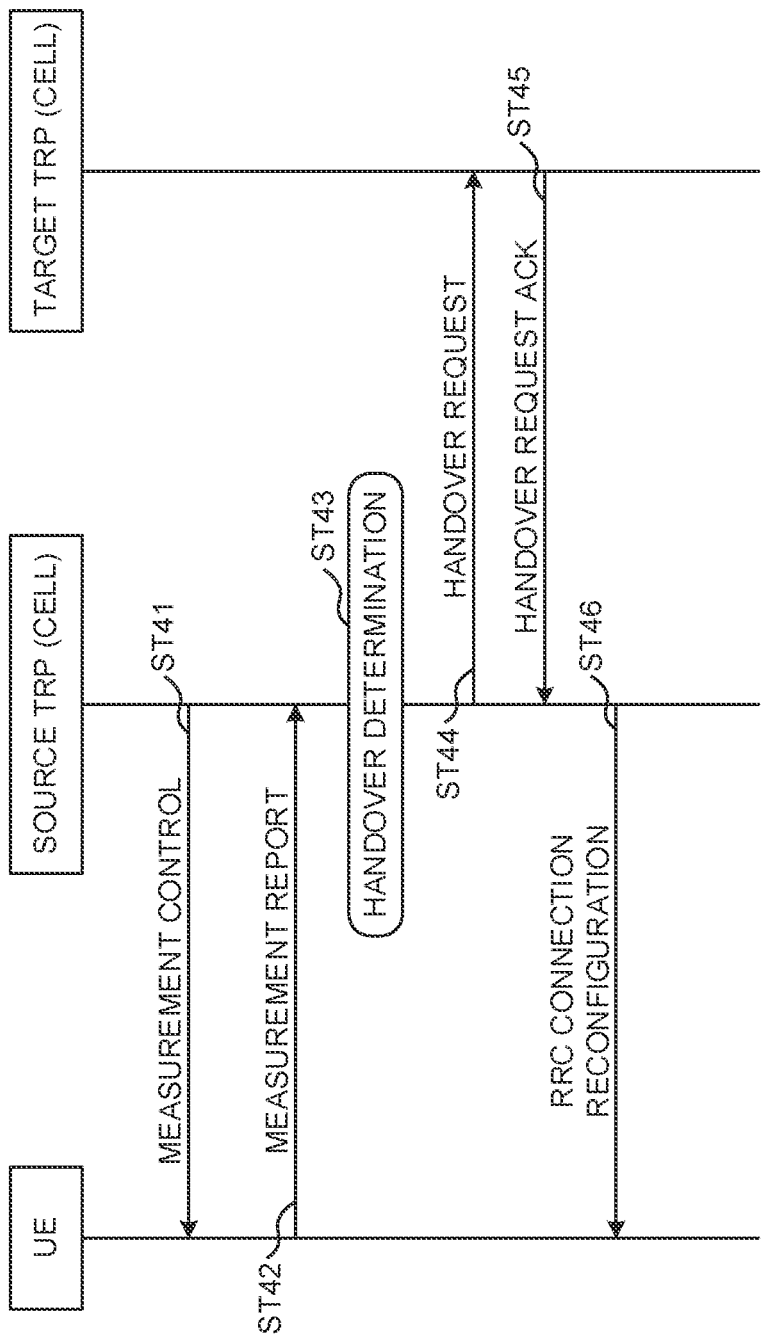
FIG. 5 is a diagram to show mobility operation (for example, handover) in a second example.

FIG. 5 is diagram to show mobility operation (for example, handover) in the second example. In FIG. 5, the source TRP first transmits measurement control to the UE (ST 41). The measurement control includes a measurement configuration. The measurement configuration is composed of a measurement target, a measurement identity, and a beam reporting configuration.

The measurement target includes beam-related information for cell with multibeams (for example, a beam ID, a beam list, and a beam-specific MRS measurement resource). For this reason, the UE receives a measurement object including information on a beam in each cell.

Each measurement identity is associated with one measurement target and one beam reporting configuration. When a plurality of measurement identities are configured, a plurality of measurement targets are associated with the same beam reporting configuration, or a plurality of beam reporting configurations are associated with the same measurement target.

For beam reporting, an event serving as a trigger of the report, and so on is configured. The beam reporting configuration includes an event (for example, event based on beam quality, and so on), and so on. Accordingly, in the UE, when beam level measurement is performed and the event is fulfilled, beam level measurement is reported. Here, examples of the event include threshold (absolute threshold or relative threshold) determination, relative comparison determination, and so on.

The UE transmits a beam level measurement report to the source TRP (ST 42). The report includes a cell ID and a beam ID. That is, the UE reports which TRP to handover is better, and which beam is better, to the source TRP. The source TRP determines whether to perform handover based on the measurement report (ST 43).

If handover is performed, the source TRP transmits a handover request to a target TRP (ST 44). The handover request includes a cell level measurement result and a selected beam/beam list indicator for beam level measurement result. The target TRP performs admission control, and then transmits a handover request ACK to the source TRP (ST 45). The source TRP transmits an RRC connection reconfiguration to the UE (ST 46). The RRC connection reconfiguration includes mobility control information.

The handover request ACK and RRC connection reconfiguration are associated with a TRP transmission beam, and include a dedicated RACH resource indicator for contention free random access (including time/frequency resource and PRACH). The handover request ACK and RRC connection reconfiguration beam include a plurality of RACH resources associated with a plurality of beams selected from the beam list.

Also, the RRC connection reconfiguration includes a new C-RNTI, a target TRP security algorithm indicator, optionally, a dedicated PRACH, SIB of target TRP, and so on.

The source TRP transmits DL allocation to the UE. The UE receives the DL allocation and RRC connection reconfiguration, and then disconnects the connection with an old cell and establishes synchronization with a new cell. Meanwhile, the source TRP transmits an SN status transfer to the target TRP.

Synchronization is established between the UE and target TRP. In the synchronization, contention-based random access or contention free random access is performed. Then, the target TRP transmits a UL allocation to the UE. The UE transmits an RRC connection reconfiguration complete to the target TRP.

In the second example, determination to handover requires many pieces of information (information at beam level). Also, in the second example, the target TRP can specify a desired transmission beam for the UE. Also, the target TRP can allocate a dedicated RACH resource/preamble associated with transmission beam for contention free random access. Such allocation can suppress an increase in the number of transmission of PRACHs transmitted from a user terminal even when beam forming is applied.

Third Example (Assumption 3)

In the third example, the case where a cell level measurement result and a beam level measurement result are reported will be described. That is, in the third example, random access is controlled using resources configured in accordance with a reporting target of cell level measurement result and beam level measurement result. As the cell level measurement result, for example, results such as RSRP, RSRQ (Reference Signal Received Quality) of each cell and/or a related cell ID, and so on. As the beam level measurement result, for example, RSRP, RSRQ (Reference Signal Received Quality) of each beam and/or a related beam ID, and a cell ID, and so on are used.

Figure 6:
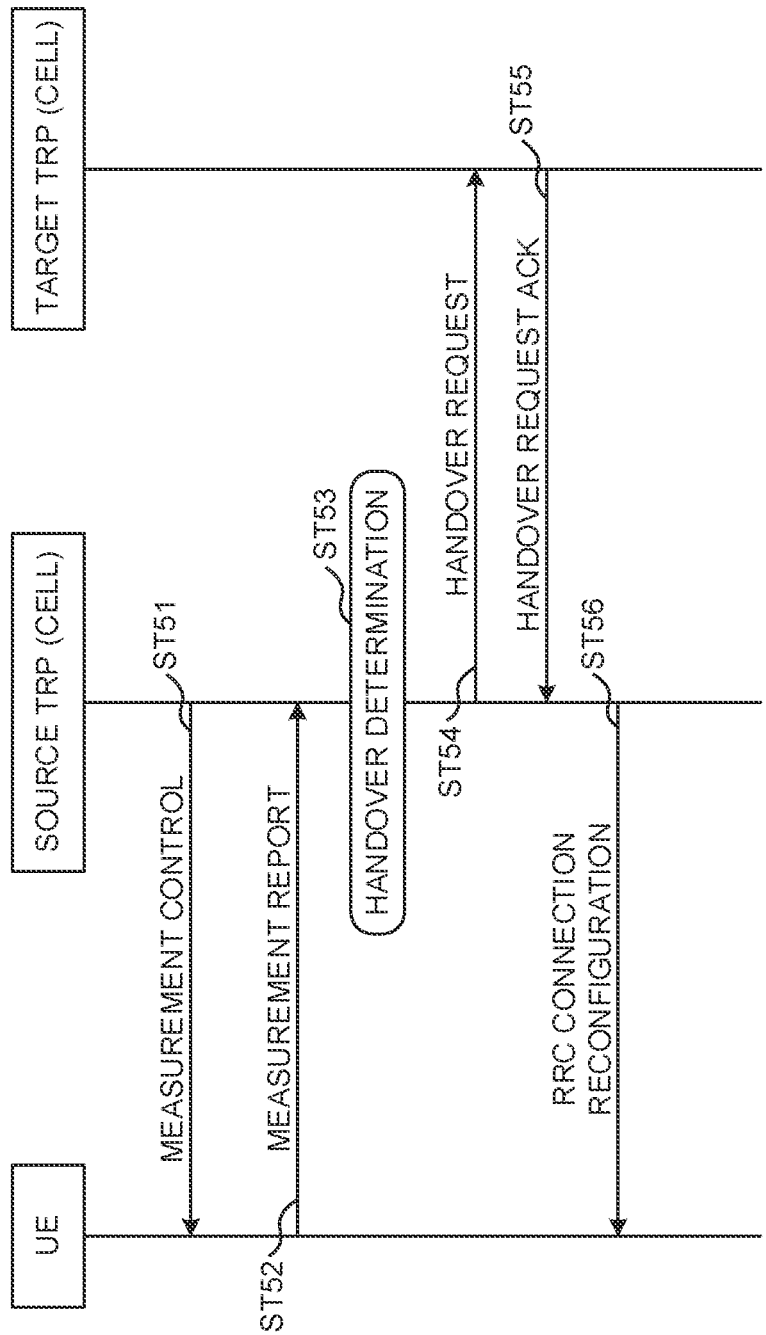
FIG. 6 is a diagram to show mobility operation (for example, handover) in a third example.

FIG. 6 is a diagram to show mobility operation (for example, handover) in the third example. In FIG. 6, the source TRP first transmits measurement control to the UE (ST 51). The measurement control includes a measurement configuration. The measurement configuration is composed of a measurement target, a measurement identity, and a reporting configuration for cell and beam.

The measurement target (cell) includes a beam list of each cell. For this reason, the UE receives a measurement object including information on a beam of each cell.

Each measurement identity is associated with one measurement target and one beam reporting configuration. When a plurality of measurement identities are configured, a plurality of measurement targets are associated with the same beam reporting configuration, or a plurality of beam reporting configurations are associated with the same measurement target.

For reporting, an event serving as a trigger of the report, and so on is configured. The reporting configuration includes an event (for example, event based on beam quality, and so on), and so on. Accordingly, in the UE, when beam level measurement is performed and the event is fulfilled, beam level measurement is reported. At the same time, when cell level measurement is performed and the event is fulfilled, cell level measurement is reported.

The UE transmits a measurement report to the source TRP (ST 52). The report includes a cell ID and a beam ID. That is, the UE reports which TRP to handover is better and which beam is better, to the source TRP. The source TRP determines whether to perform handover based on the measurement report (ST 53).

When handover is performed, the source TRP transmits a handover request to a target TRP (ST 54). The handover request includes a cell level measurement result and a selected beam/beam list indicator for beam level measurement result. The target TRP performs admission control, and then transmits a handover request ACK to the source TRP (ST 55). The source TRP transmits an RRC connection reconfiguration to the UE (ST 56). The RRC connection reconfiguration includes mobility control information.

The handover request ACK and the RRC connection reconfiguration are associated with a TRP transmission beam, and include a dedicated RACH resource indicator (including time/frequency resource and PRACH) for contention free random access. The handover request ACK and the RRC connection reconfiguration include a plurality of RACH resources associated with a plurality of beams selected from the beam list.

Also, the RRC connection reconfiguration includes a new C-RNTI, a target TRP security algorithm indicator, optionally, a dedicated PRACH, SIB of the target TRP, and so on.

The source TRP transmits DL allocation to the UE. The UE receives the DL allocation and the RRC connection reconfiguration, and then disconnects the connection with an old cell and establishes synchronization with a new cell. Meanwhile, the source TRP transmits an SN status transfer to the target TRP.

Synchronization is established between the UE and the target TRP. In the synchronization, contention-based random access or contention free random access is performed. Then, the target TRP transmits UL allocation to the UE. The UE transmits an RRC connection reconfiguration complete to the target TRP.

In the third example, measurement control report and measurement report include the following three candidates.

<First Candidate>

In the first candidate, the measurement results of cell level measurement and beam level measurement are reported based on reporting conditions respectively configured to cell level measurement and beam level measurement.

In the first candidate, the event for cell level measurement and the event for beam level measurement are separately configured, and the measurement results are separately fed back. The feedback may be only one measurement result, or both measurement results. That is, cell level measurement and beam level measurement are separately controlled. Accordingly, in the UE, when cell level measurement is performed and the event is fulfilled, the cell level measurement is reported. Meanwhile, when beam level measurement is performed and the event is fulfilled, the beam level measurement is reported. Here, examples of the event include threshold (absolute threshold or relative threshold) determination, relative comparison determination, and so on.

<Second Candidate>

In the second candidate, in the case where one of the measurement result reports of cell level measurement and beam level measurement is triggered, the other measurement result is reported.

In the second candidate, the event for cell level measurement and the event for beam level measurement are separately configured, and the measurement results are associated with each other to feed back. In the feedback, the results of both measurements are reported by the trigger of one measurement result report. Here, examples of the event include threshold (absolute threshold or relative threshold) determination, relative comparison determination, and so on.

As the method of reporting the results of both measurements by the trigger of one measurement result report, there are three options.

In the first option, a cell level measurement result is reported for a cell in which at least one beam level measurement result report is triggered. In this case, the cell level measurement result is reported regardless of whether the event for the cell level measurement is fulfilled. For example, in the UE, when at least one beam level measurement is performed and the event is fulfilled, the UE performs cell level measurement, and reports the beam level measurement result and the cell level measurement result.

In the second option, at least one beam level measurement result is reported for a cell in which a cell level measurement result report is triggered. In this case, the beam level measurement result is reported regardless of whether the event for beam level measurement is fulfilled. For example, in the UE, when cell level measurement is performed and the event is fulfilled, the UE performs at least one beam level measurement, and reports the beam level measurement result and the cell level measurement result. Note that, the number (maximum) of beam level measurement result reports (for each cell/all the cell) may be included in a measurement configuration.

In the third option, a cell level measurement result and a beam level measurement result are reported when the event for beam level measurement is fulfilled, or the event for cell level measurement is fulfilled. For example, in the UE, when cell level measurement is performed and the event is fulfilled, or when at least one beam level measurement is performed and the event is fulfilled, the UE performs the other measurement, and reports the beam level measurement result and the cell level measurement result.

<Third Candidate>

In the third candidate, measurement results of both cell level measurement and beam level measurement are reported based on criteria that are set considering cell level measurement and beam level measurement.

In the third candidate, criteria considering cell level measurement and beam level measurement are configured, and a cell level measurement result and a beam level measurement result are together fed back.

As the method of feeding back the cell level measurement result and the beam level measurement result together, there are two options.

In the first option, the criteria (new event) include a condition or threshold determination for cell and a condition or threshold determination for beam. When both conditions are fulfilled or a given target parameter exceeds a threshold value, feedback is performed. Here, examples of the condition include, for example, a case where the received power and/or received quality of a cell and the received power and/or received quality of at least one beam exceed a predetermined threshold value. Also, examples of a target parameter for threshold determination include received power or received quality for each cell or beam, and so on. For example, in a UE, when at least one beam level measurement and cell level measurement are performed, and the condition for cell is fulfilled or a given target parameter exceeds the threshold value of the measurement result, and the condition for beam is fulfilled or a given target parameter exceeds the threshold value of the measurement result, the beam level measurement result and the cell level measurement result are reported.

In the second option, the criteria include a condition or threshold determination for cell, and a condition or threshold determination for beam, and the number of beams that fulfill a predetermined condition. When all the conditions are fulfilled or a given target parameter exceeds the threshold value, feedback is performed. Here, the predetermined condition for the number of beams is defined as, for example, the number of beams that is greater than "N," and so on. This "N" may be included in the measurement configuration. Here, examples of the condition include, for example, the case where, in a given cell, the number of beams, of which received power and/or received quality per beam exceeds a predetermined threshold value, is N or greater. Also, examples of the target parameter for threshold determination include the number of beams that fulfill received power and/or received quality per beam or conditions, and so on. For example, in a UE, when at least one beam level measurement and cell level measurement are performed, the condition for cell is fulfilled or a given target parameter exceeds the threshold value of the measurement result, and the condition for beam is fulfilled or a given target parameter exceeds the threshold value of the measurement result, and the number of beams fulfills a predetermined condition, the beam level measurement result and the cell level measurement result are reported.

Figure 7:
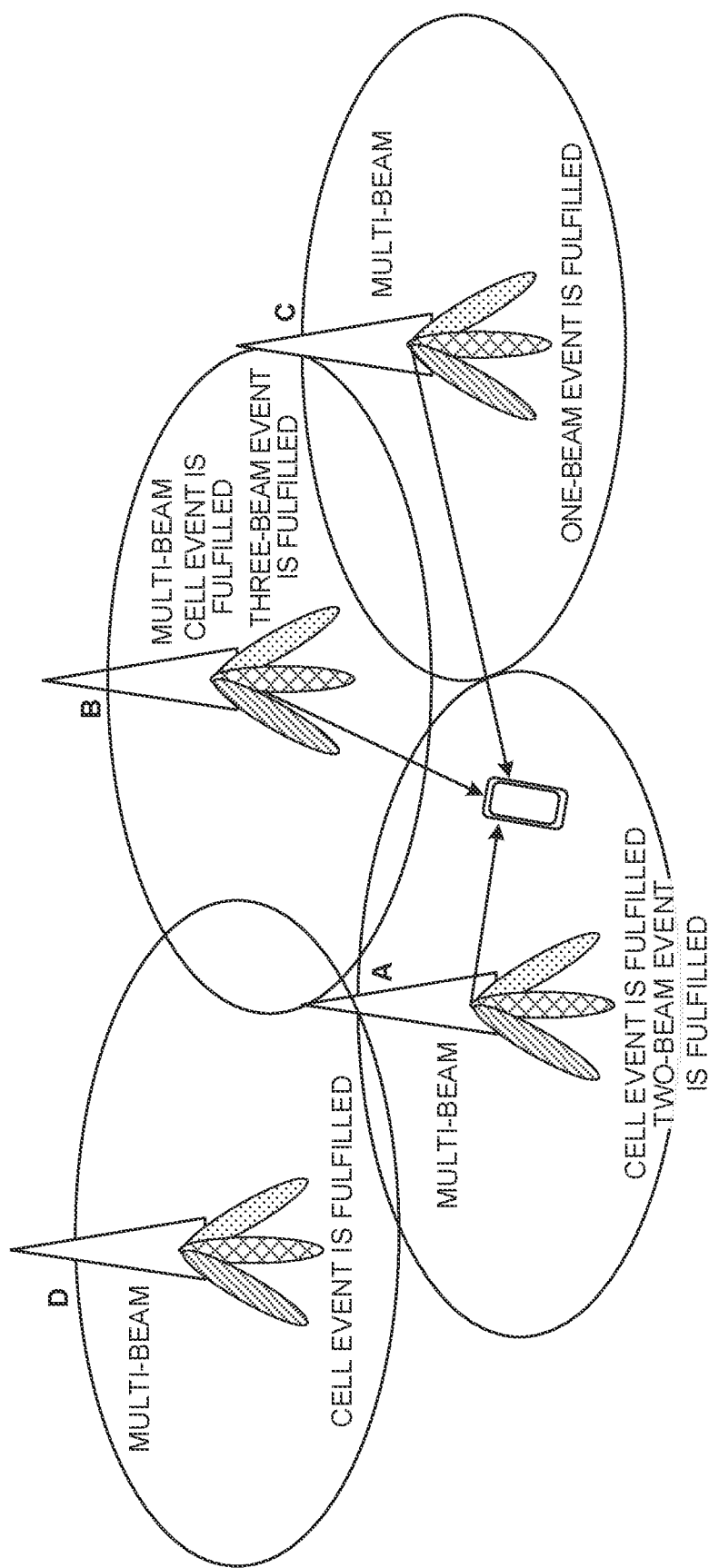
FIG. 7 is a diagram to explain examples of a first to third candidate in the third example.

FIG. 7 is a diagram to explain examples of the first to third candidates in the third example. In FIG. 7, for cell A, the event of the cell level measurement result is fulfilled (cell event is fulfilled), and the event of beam level measurement result for two beams is fulfilled (two-beam event is fulfilled). Also, for cell B, the event of cell level measurement result is fulfilled (cell event is fulfilled), the event of beam level measurement result for three beams is fulfilled (three-beam event is fulfilled). For cell C, the event of beam level measurement result for one beam is fulfilled (one-beam event is fulfilled). For cell D, the event of cell level measurement result is fulfilled (cell event is fulfilled).

When the UE reports the result with the first candidate, for cell A, the UE reports the cell level measurement result and two-beam level measurement result. For cell B, the UE reports the cell level measurement result and three-beam level measurement result. For cell C, the UE reports one-beam level measurement result. For cell D, the UE reports the cell level measurement result.

When the UE reports the result with the first option of the second candidate, for cell A, the UE reports the cell level measurement result and two-beam level measurement result. For cell B, the UE reports the cell level measurement result and three-beam level measurement result. For cell C, the UE reports the cell level measurement result and one-beam level measurement result. For cell D, the UE reports the cell level measurement result.

When the UE reports the result with the first option of the third candidate, for cell A, the UE reports the cell level measurement result and two-beam level measurement result. For cell B, the UE reports the cell level measurement result and three-beam level measurement result. The UE does not report any result for cell C and cell D.

When the UE reports the result with the second option of the third candidate, the UE determines that the condition that the number of beams is greater than 2 is fulfilled, and reports the cell level measurement result and three-beam level measurement result for cell B. The UE does not report any result for cell A, cell C, or cell D.

Figure 8:
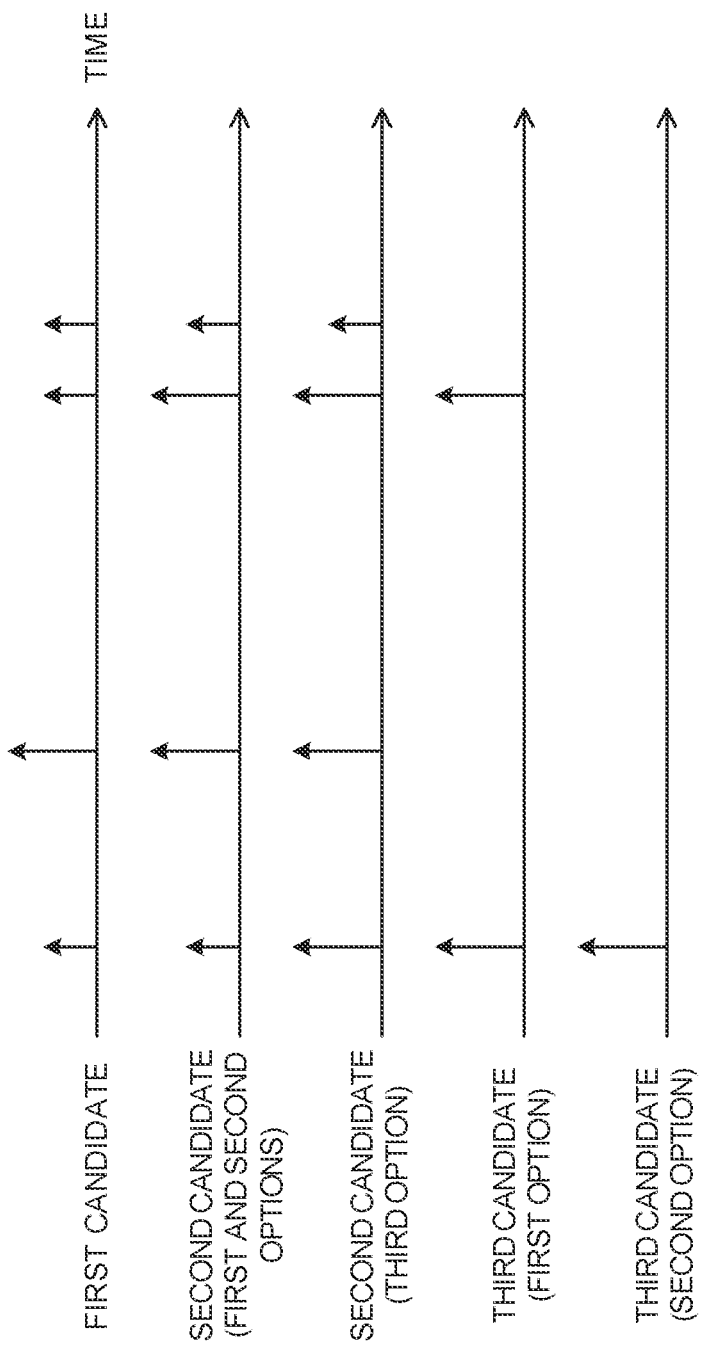
FIG. 8 is a diagram to explain the comparison of a first to third candidate in the third example.

FIG. 8 is a diagram to explain the comparison of the first to third candidates in the third example. In FIG. 8, the height of the arrow (longitudinal axis) corresponds to the overhead (size) of a report, and the frequency of the arrows corresponds to reporting frequency. In the table of FIG. 8, the highest reporting frequency and the lowest reporting overhead are expressed as "1."

As can be seen from FIG. 8, for the reporting frequency, the first candidate and the second candidate are the highest, the first option of the third candidate is the second highest, and the second option of the third candidate is the lowest. For the reporting overhead, the third option of the second candidate and the third candidate are the lowest, the first and second options of the second candidate is the second lowest, and the first candidate is the highest.

In the third example, since a cell level measurement result and a beam level measurement result are reported, communication with high quality can be performed during mobility. Specifically, in the second example, in the base station, the number of target beams to be reported is limited, and thus, received power and quality at a cell level are estimated based on information on a part of the reported beams. In the third example, a cell level measurement result is obtained based on all the beams received by the UE, and can be reported to the base station. As a result, more accurate cell level measurement result can be employed for handover determination and so on, together with the beam level measurement result.

In the first to third examples, when the measurement result is reported, an index associated with the measurement result may be reported. For example, in the third example, when both a cell level measurement result and a beam level measurement result are reported, the cell level measurement result and the beam level measurement result are associated with an index, and the index may be reported.

In the first to third examples, the case where an event is used as a trigger for the measurement result report is descried, but the present invention is not limited thereto. In addition to determination whether the event is fulfilled, or instead of such determination, the determination result obtained by performing threshold determination for a given parameter may be employed as the trigger for the measurement result report.

(Radio Communication System)

Now, the structure of the radio communication system according to one embodiment of the present invention will be described below. In this radio communication system, communication is performed using one or a combination of the herein-contained embodiments of the present invention.

Figure 9:
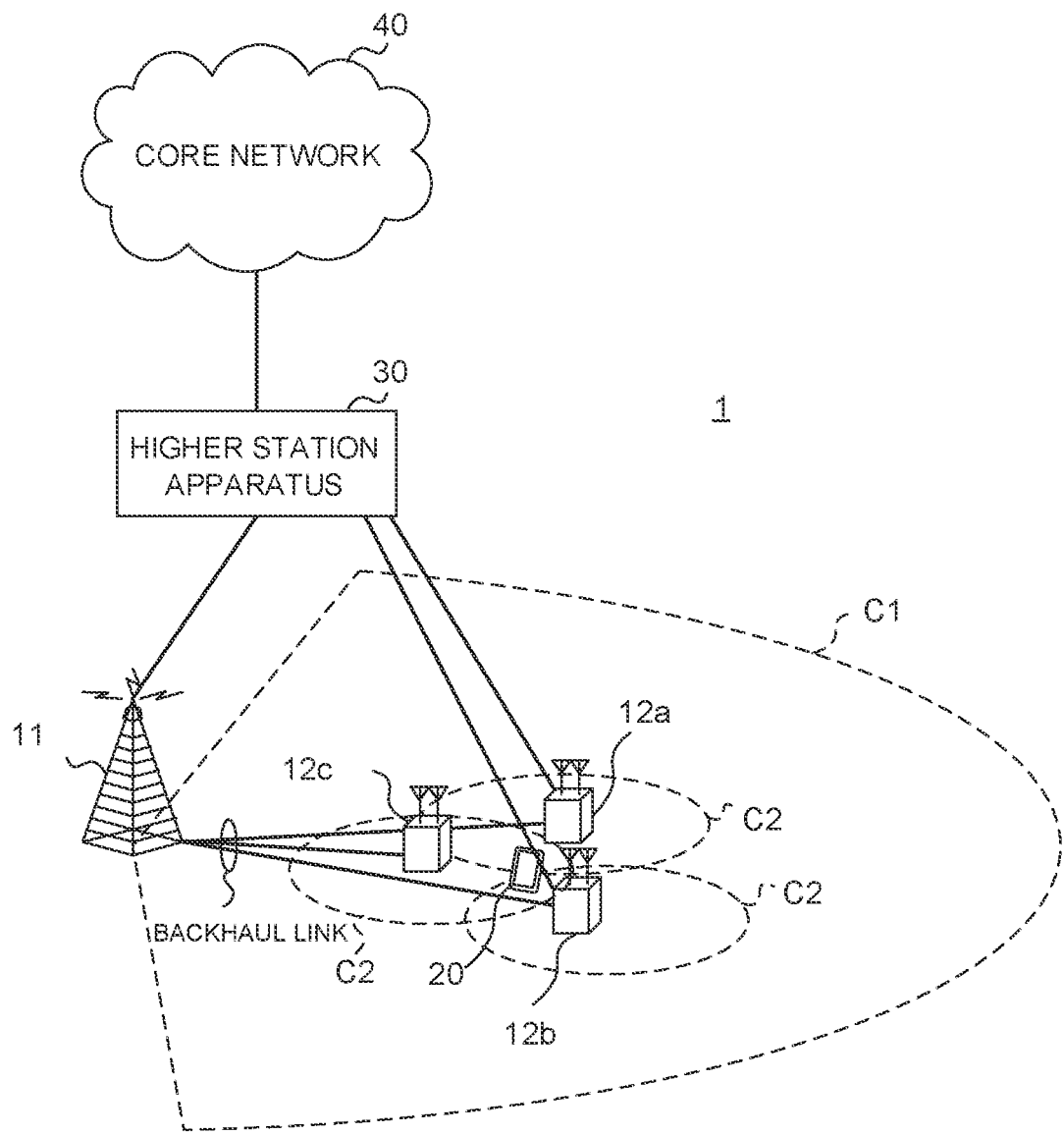
FIG. 9 is a diagram to show an example of a schematic structure of a radio communication system according to one embodiment of the present invention.

FIG. 9 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)", "LTE-A (LTE-Advanced)", "LTE-B (LTE-Beyond)", "SUPER 3G, "IMT-Advanced," "4G (4th generation mobile communication system)", "5G (5th generation mobile communication system)", "FRA (Future Radio Access)", "New-RAT (Radio Access Technology)" and so on, or may be seen as a system to implement these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The radio base stations 11 and 12 may be referred to as a "transmitting/receiving point (TRP)."

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH. A shared control channel that reports the presence or absence of a paging channel is mapped to a downlink L1/L2 control channel (for example, PDCCH), and the data of the paging channel (PCH) is mapped to the PDSCH. Downlink reference signals, uplink reference signals and physical downlink synchronization signals are separately arranged.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH.

The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 10:
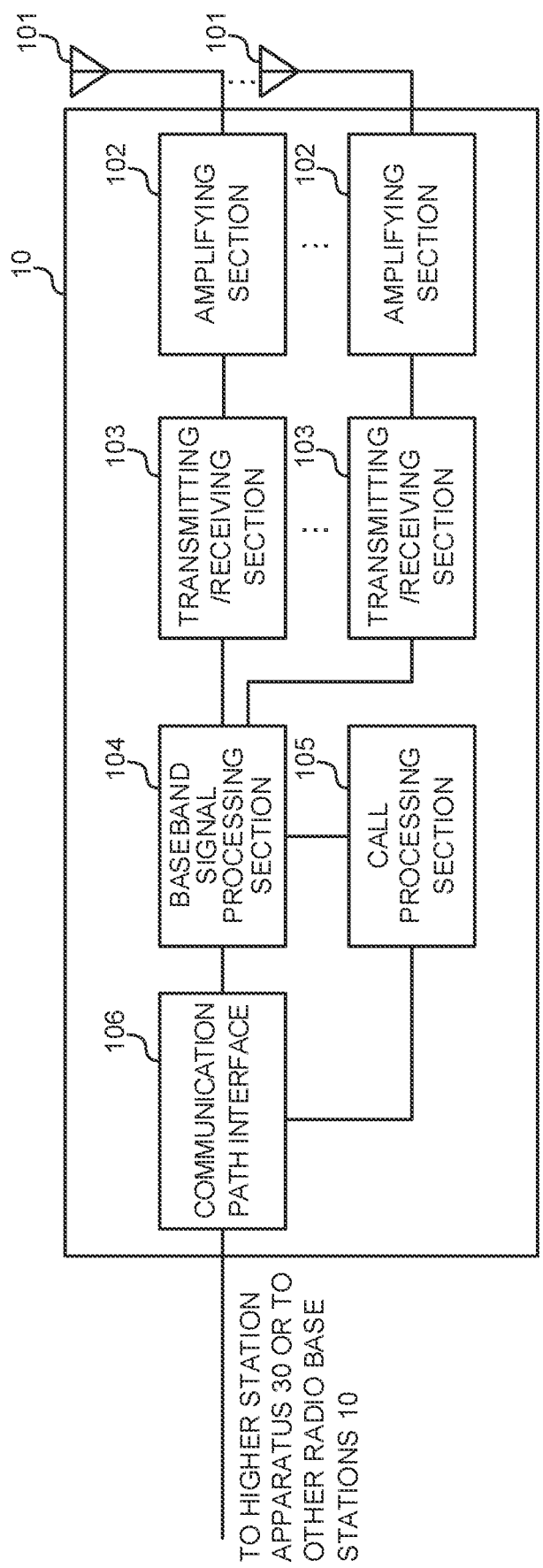
FIG. 10 is a diagram to show an example of an overall structure of a radio base station according to one embodiment of the present invention.

FIG. 10 is a diagram to show an example of an overall structure of a radio base station according to one embodiment of the present invention.

A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 include an analog beam forming section that is configured to be able to adopt both multi-beam approach and single-beam approach and which provides analog beam forming. The beam forming section can be constituted by a beam forming circuit (for example, a phase shifter, a phase shifting circuit, etc.) or beam forming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 transmit synchronization signals, broadcast channels, system information (SIBs), and so on. In mobility operation, the transmitting/receiving sections 103 transmit measurement control, UL allocation, DL allocation, an RRC connection reconfiguration, and so on to the user terminal 20. Also, the transmitting/receiving sections 103 transmit a handover request, a handover request ACK, an SN status transfer, and so on to the radio base station.

Figure 11:
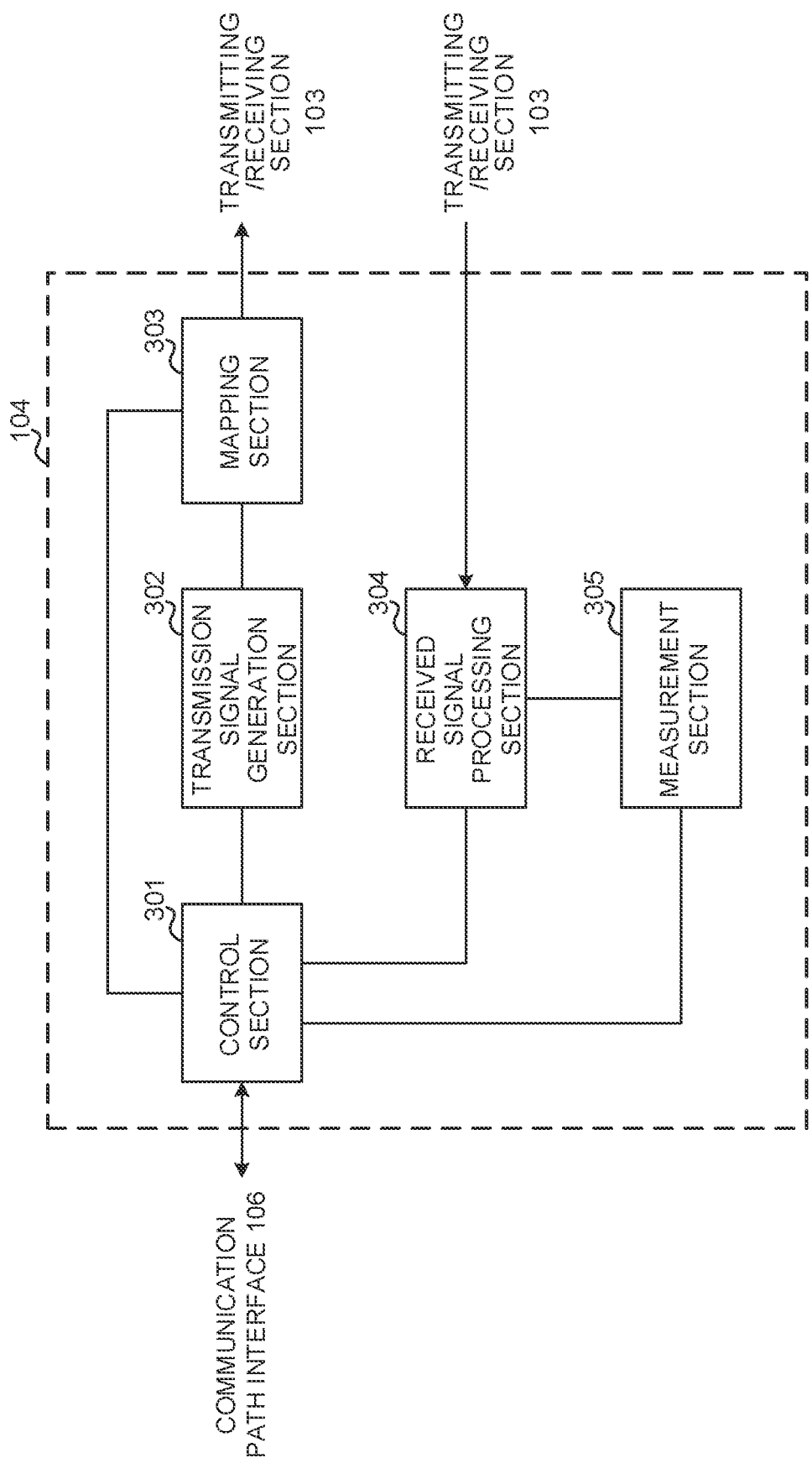
FIG. 11 is a diagram to show an example of a functional structure of a radio base station according to one embodiment of the present invention.

FIG. 11 is a diagram to show an example of a functional structure of a radio base station according to one embodiment of the present invention.

Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104. The baseband signal processing section 104 has digital beam forming functions for providing digital beam forming.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, the generation of signals by the transmission signal generation section 302 (including signals corresponding to synchronization signals, MIB, paging channel, broadcast channel, etc.), the allocation of signals by the mapping section 303, and so on. The control section 301 controls allocation resource (symbols, frequency resources) to a paging channel linked to the resource allocated to synchronization signals and/or MIBs (symbols, frequency resources) described in the first to third examples. Furthermore, the control section 301 controls the signal receiving processes in the received signal processing section 304, the measurements of signals in the measurement section 305, and so on.

The control section 301 controls scheduling of system information (SIBs, the MIB, etc.), downlink data signals that are transmitted in the PDSCH (including the passing message PCH), and downlink control signals that are transmitted in the PDCCH and/or the EPDCCH (covering, for example, resource allocation, the shared control channel to report the presence or absence of paging messages, the signal to reporting the multi-beam approach or the single-beam approach, and so on). The control section 301 controls the scheduling of synchronization signals (for example, PSS/SSS and/or the like) and downlink reference signals such as CRSs, CSI-RSs, DMRSs and DMRSs.

In addition, the control section 301 controls the scheduling of uplink data signals that are transmitted in the PUSCH, uplink control signals that are transmitted in the PUCCH and/or the PUSCH (for example, delivery acknowledgment information), random access preambles that are transmitted in the PRACH, uplink reference signals, and so on.

The control section 301 may exert control so that transmitting beams and/or receiving beams are formed using the digital beam forming (for example, precoding) by the baseband signal processing section 104 and/or the analog beam forming (for example, phase rotation) by the transmitting/receiving sections 103.

For example, if the multi-beam approach is applied, the control section 301 may exert control so that, in subframes (sweeping periods) where a synchronization signal, a broadcast channel and/or a paging channel is included, each symbol is applied different beam forming, and transmitted while being swept.

In mobility operation, the control section 301 controls the determination of whether handover is performed based on a measurement report. In mobility operation, the control section 301 executes admission control and controls synchronization with the UE.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20. Also, based on commands from the control section 301, the transmission signal generation section 302 generates a signal to report the multi-beam approach or the single-beam approach, in the shared control channel where the MIB or system information that is equivalent to the MIB is included.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals (uplink control signals, uplink data signals, uplink reference signals and so on) that are transmitted from the user terminal 20. For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), channel states and so on. The measurement results may be output to the control section 301.

(User Terminal)

A user terminal 20 receives a DL measurement signal (for example, DL signal to which beam forming is applied) transmitted from one or a plurality of antenna ports, performs cell level measurement and/or beam level measurement using the DL signal, reports the measurement result of the cell level measurement and/or the beam level measurement, and controls random access using resources configured in accordance with a reporting target of the measurement result.

Figure 12:
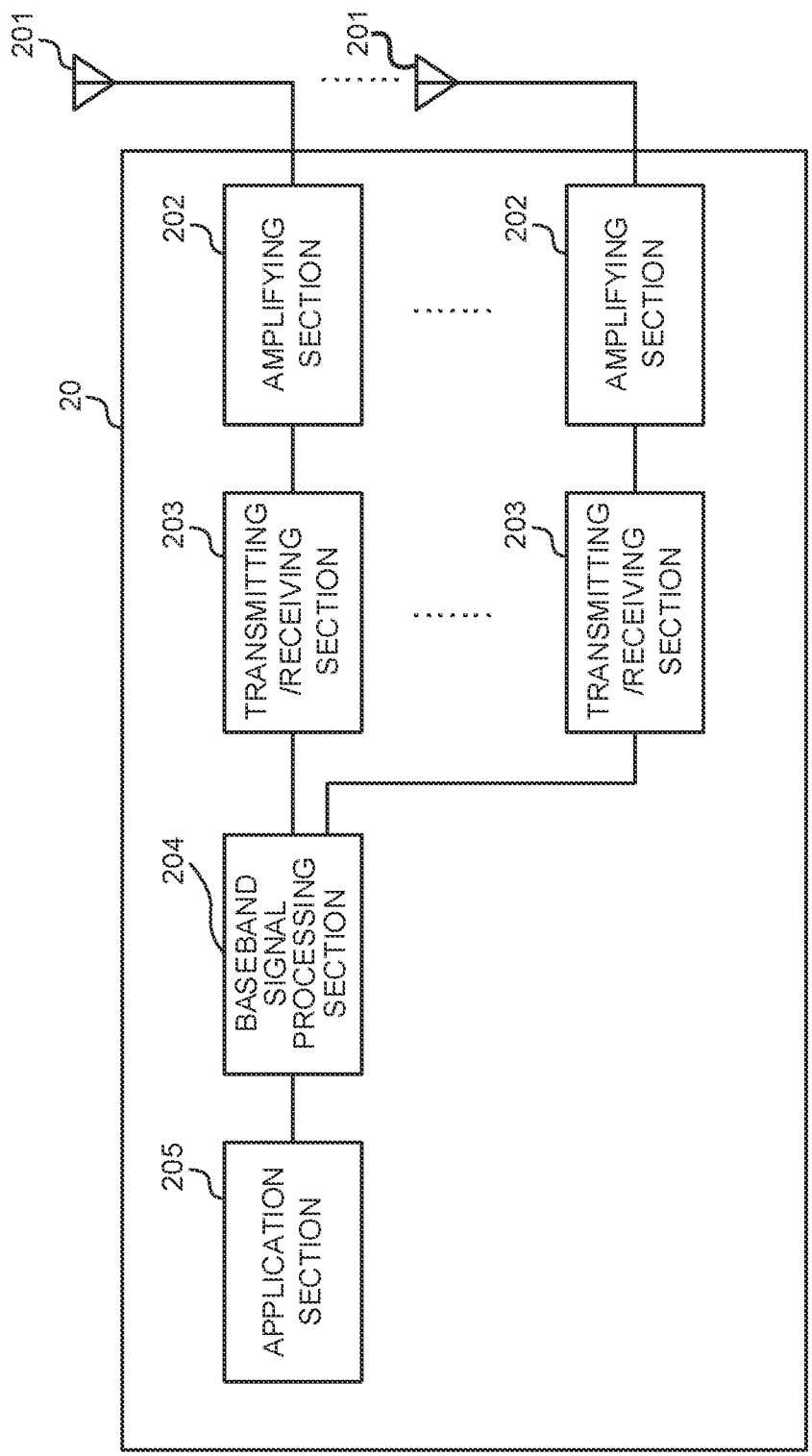
FIG. 12 is a diagram to show an example of an overall structure of a user terminal according to one embodiment of the present invention.

FIG. 12 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beam forming section that forms analog beams. The analog beam forming section may be constituted by an analog beam forming circuit (for example, a phase shifter, a phase shifting circuit, etc.) or analog beam forming apparatus (for example, a phase shifting device) that can be described based on general understanding of the technical field to which the present invention pertains. Furthermore, the transmitting/receiving antennas 201 may be constituted by, for example, array antennas.

The transmitting/receiving sections 203 receive synchronization signals, broadcast channels, system information (SIBs), and so on. The transmitting/receiving sections 203 receive a measurement object including information on beams. In mobility operation, the transmitting/receiving sections 203 receive measurement control, UL allocation, DL allocation, an RRC connection reconfiguration, and so on. Also, in mobility operation, the transmitting/receiving sections 203 transmit a measurement report, an RRC connection reconfiguration complete, and so on.

Figure 13:
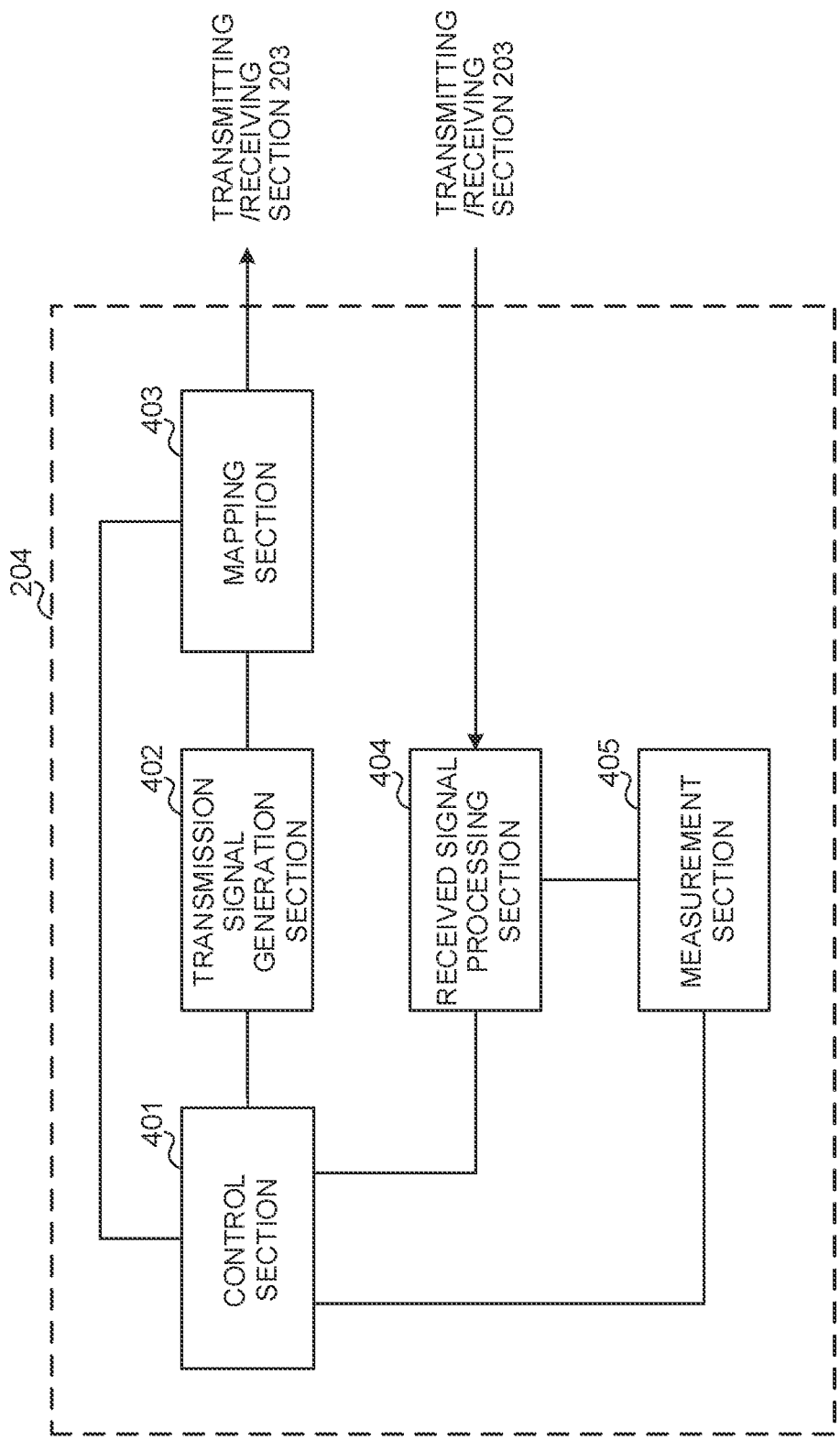
FIG. 13 is a diagram to show an example of a functional structure of a user terminal according to one embodiment of the present invention.

FIG. 13 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and so on) and/or uplink data signals based on the results of deciding whether or not retransmission control is necessary for the downlink control signals and/or downlink data signals, and so on.

The control section 401 may exert control so that transmitting beams and/or receiving beams are formed using the digital BF (for example, precoding) by the baseband signal processing section 204 and/or the analog BF (for example, phase rotation) by the transmitting/receiving sections 203.

In addition, the control section 401 may control the receiving operation so that the paging channel is received by monitoring the resources that are determined according to the detection result of the synchronization signal and/or the broadcast channel received from the radio base station before the random access preamble is transmitted.

In mobility operation, the control section 401 executes admission control and controls synchronization with the UE. In this case, the control section 401 disconnects the connection with an old cell and establishes synchronization with a new cell. The control section 401 controls random access (contention-based random access or contention free random access) using resources configured in accordance with a reporting target of the measurement result.

The control section 401 controls reporting of the measurement result of cell level measurement and/or beam level measurement based on reporting conditions separately configured to cell level measurement and beam level measurement. When one of the cell level measurement result report and beam level measurement result report is triggered, the control section 401 executes control so as to report the measurement result of the other measurement. The control section 401 controls reporting of the measurement result of cell level measurement and beam level measurement based on criteria that are set considering cell level measurement and beam level measurement.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from the control section 401, the received signal processing section 404 receives synchronization signals and broadcast channels which the radio base station transmits by applying beam forming. In particular, the received signal processing section 404 receives synchronization signals and broadcast channels allocated to at least one of a plurality of time domains (for example, symbols) constituting a predetermined transmission time interval (for example, subframes or slots).

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using the beamforming RS transmitted from the radio base station 10. The measurement section 405 can be constituted by a measurer, a measurement circuit or measurement apparatus that can be described based on general understanding of the technical field to which the present invention pertains.

The measurement section 405 measures the quality of a cell (cell level measurement). Also, the measurement section 405 measures the quality of at least one beam (beam level measurement).

The measurement section 405 may measure, for example, the received power (for example, RSRP), the received quality (for example, RSRQ, received SINR), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 14:
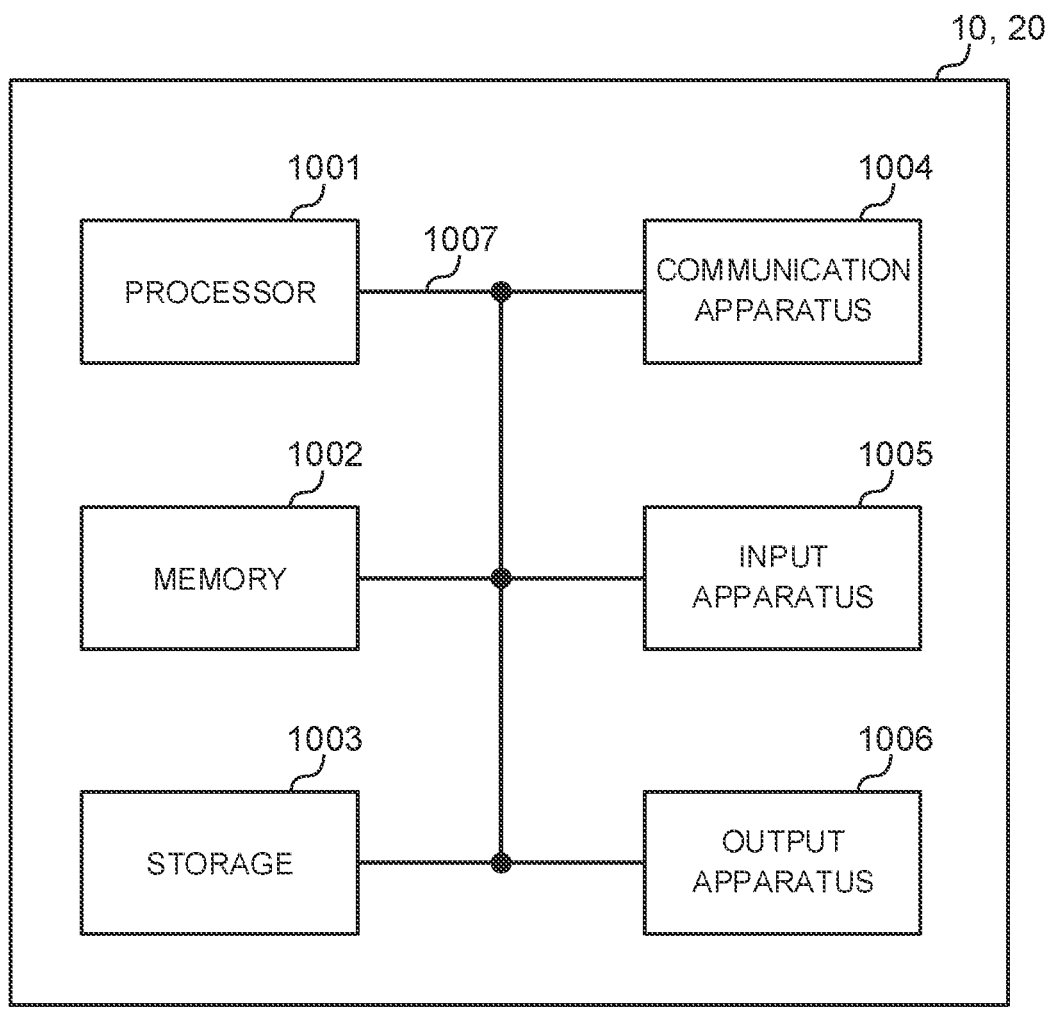
FIG. 14 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 14 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on, are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Further, a radio frame may be comprised of one or more periods (frames) in the time domain. Each of one or more periods (frames) constituting a radio frame may be referred to as a "subframe." Further, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, one subframe may be referred to as a "transmission time interval (TTI)," or a plurality of consecutive subframes may be referred to as a "TTI," or one slot may be referred to as a "TTI." That is, a subframe and/or a TTI may be a subframe (one ms) in existing LTE, may be a shorter period than one ms (for example, one to thirteen symbols), or may be a longer period than one ms.

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of one ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "shortened subframe," or a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that, RBs may be referred to as a "physical resource block (PRB: Physical RB)," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, symbols and so on described above are merely examples. For example, configurations pertaining to the number of subframes included in a radio frame, the number of slots included in a subframe, the number of symbols and RBs included in a slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Further, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency, microwave and optical regions (either visible or invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiver that receives a measurement configuration including an information on a number of reports; and
   a processor that, when reporting of a cell-level measurement result is triggered, controls reporting of a beam-level measurement result based on the information on the number of reports,
   wherein the information on the number of reports included in the measurement configuration indicates a maximum number of beam-level measurement result reports.

2. The terminal according to claim 1, wherein the maximum number of beam-level measurement result reports is a maximum number of beam-level measurement result reports for all cell.

3. The terminal according to claim 1, wherein the processor controls to perform the reporting of the beam-level measurement result irrespective of an event corresponding to a beam-level measurement.

4. A radio communication method for a terminal, comprising:
   receiving a measurement configuration including an information on a number of reports; and
   when reporting of a cell-level measurement result is triggered, controlling reporting of a beam-level measurement result based on the information on the number of reports, wherein the information on the number of reports included in the measurement configuration indicates a maximum number of beam-level measurement result reports.

5. A base station comprising:

a transmitter that transmits a measurement configuration including an information on a number of reports; and a processor that, when the base station triggers reporting of a cell-level measurement result, controls receiving of a report of a beam-level measurement result based on the information on the number of reports, wherein the information on the number of reports included in the measurement configuration indicates a maximum number of beam-level measurement result reports.

6. A system comprising a terminal and a base station, wherein:

the base station comprises:

a transmitter that transmits a measurement configuration including an information on a number of reports; and a first processor that, when the base station triggers reporting of a cell-level measurement result, controls receiving of a report of a beam-level measurement result based on the information on the number of reports;

the terminal comprises:

a receiver that receives the measurement configuration; and a second processor that, when reporting of the cell-level measurement result is triggered, controls reporting of the beam-level measurement result based on the information on the number of reports, wherein the information on the number of reports included in the measurement configuration indicates a maximum number of beam-level measurement result reports.

* * * * *